(12) United States Patent
Church et al.

(10) Patent No.: US 11,586,617 B2
(45) Date of Patent: Feb. 21, 2023

(54) METHOD AND COMPUTING DEVICE FOR GENERATING A SEARCH QUERY FOR A GRAPH DATABASE

(71) Applicant: WORKIVA INC., Ames, IA (US)

(72) Inventors: Daniel Louis Church, Bozeman, MT (US); Nathaniel Tobias Ohler, Bozeman, MT (US); Ephie Risho, Bozeman, MT (US); Jade Dean Robbins, Belgrade, MT (US); Gary Rhoe Ingram, Livingston, MT (US); Jason Lee Erickson, Bozeman, MT (US); John Arthur Bonk, Dexter, MI (US); Ryan Michael Gilsdorf, Denver, CO (US); Alexander Jacob Iselin, Lafayette, CO (US); Lauren Jewel Evans, Helena, MT (US)

(73) Assignee: WORKIVA INC., Ames, IA (US)

( * ) Notice: Subject to any disclaimer, the term of this patent is extended or adjusted under 35 U.S.C. 154(b) by 0 days.

(21) Appl. No.: 17/329,467

(22) Filed: May 25, 2021

(65) Prior Publication Data
US 2021/0279234 A1    Sep. 9, 2021

Related U.S. Application Data

(63) Continuation of application No. 16/450,191, filed on Jun. 24, 2019, now Pat. No. 11,048,696.

(51) Int. Cl.
*G06F 16/242*    (2019.01)
*G06F 16/901*    (2019.01)
*G06F 16/245*    (2019.01)
*G06F 9/451*    (2018.01)
*G06F 3/0482*    (2013.01)
*G06F 3/0484*    (2022.01)
*G06F 16/248*    (2019.01)

(52) U.S. Cl.
CPC ........ *G06F 16/2428* (2019.01); *G06F 3/0482* (2013.01); *G06F 3/0484* (2013.01); *G06F 9/451* (2018.02); *G06F 16/245* (2019.01); *G06F 16/248* (2019.01); *G06F 16/9024* (2019.01); *G06F 2203/04803* (2013.01)

(58) Field of Classification Search
CPC .................................................. G06F 16/2428
See application file for complete search history.

(56) References Cited

U.S. PATENT DOCUMENTS

| | | | |
|---|---|---|---|
| 2001/0021936 A1* | 9/2001 | Bertram | H04L 41/22 715/245 |
| 2003/0120682 A1 | 6/2003 | Bestgen et al. | |
| 2004/0088158 A1 | 5/2004 | Sheu et al. | |
| 2008/0201313 A1* | 8/2008 | Dettinger | G06F 16/248 |
| 2014/0040363 A1 | 2/2014 | Reddy et al. | |
| 2016/0306897 A1 | 10/2016 | Huang et al. | |
| 2019/0095395 A1* | 3/2019 | Piecko | G06F 16/9024 |
| 2019/0121810 A1* | 4/2019 | Zhuang | G06F 16/213 |

* cited by examiner

*Primary Examiner* — Van H Oberly
(74) *Attorney, Agent, or Firm* — Faegre Drinker Biddle & Reath LLP

(57) ABSTRACT

In an embodiment, a method for generating a search query for a graph database includes displaying a list of vertex properties on a user interface; receiving, via the user interface, a selection of one or more of the displayed vertex properties; forming a graph database query based on selection; and displaying a report containing a result of the query.

18 Claims, 15 Drawing Sheets

402:
- Person
  - First Name
  - Last Name
  - Lives At: Location
    - City
    - State
    - Country
  - Has Benefits: Benefits
    - Pension
    - Medical
    - Dental
  - Works for: Company
    - Name
    - Industry Search Preview — 412

404

406 — Column Order

FIG. 4F

Column Order
- Last Name
- State

Preview — 412
| Last Name | State |
|---|---|
|  |  |

402:
- Search
- ☐ Person
  - ☐ First Name
  - ☒ Last Name
  - ☐ Lives At: Location
    - ☐ City
    - ☒ State
    - ☐ Country
  - ☐ Has Benefits: Benefits
    - ☐ Pension
    - ☐ Medical
    - ☐ Dental
  - ☐ Works for: Company
    - ☐ Name
    - ☐ Industry 400, 404, 406

FIG. 4G

Preview — 412

| Last Name | State | Dental | Company Name | Industry |
|---|---|---|---|---|
| Astranskas | Washington | United Care HMO | Packard | Lumber |
| Chu | California | Independence | Cyberdyne Systems | Robotics |
| Dirkson | Illinois | Allied Dental | Fisher-Bernier | Software Services |
| Kulkarni | Indiana | Allied Dental | Kemmer, Inc. | Transportation |
| Lim | Michigan | Independence | ACME Auto | Automotive |
| Patterson | Indiana | Allied Dental | Kemmer, Inc. | Transportation |
| Piccoli | Iowa | | APM, Inc. | Agriculture |
| Sharrow | Illinois | Allied Dental | Fisher-Bernier | Software Services |

404

Column Order
Last Name
State
Dental
Company Name
Industry

406

Search

- ☐ Person
  - ☐ First Name
  - ☒ Last Name
  - Lives At: Location
    - ☐ City
    - ☒ State
    - ☐ Country
  - Has Benefits: Benefits
    - ☐ Pension
    - ☐ Medical
    - ☒ Dental
  - Works for: Company
    - ☒ Name
    - ☒ Industry

METHOD AND COMPUTING DEVICE FOR GENERATING A SEARCH QUERY FOR A GRAPH DATABASE

CROSS-REFERENCE TO RELATED APPLICATIONS

This application is a continuation of U.S. patent application Ser. No. 16/450,191, filed Jun. 24, 2019, which is incorporated herein by reference.

TECHNICAL FIELD

The disclosure relates generally to database searching and, more particularly, to a method and computing device for generating a search query in a graph database.

BACKGROUND

Pulling a report from a database typically involves the use of a structured query language to form the appropriate search parameters. Modern graphical user interfaces have been developed to simplify database searching by insulating the user from the complexities of the query itself. However, newer types of databases, such as graph databases, do not lend themselves to traditional search interfaces.

DRAWINGS

While the appended claims set forth the features of the present techniques with particularity, these techniques may be best understood from the following detailed description taken in conjunction with the accompanying drawings of which:

FIG. 4A, FIG. 4B, FIG. 4C, FIG. 4D, FIG. 4E, FIG. 4F, FIG. 4G, and FIG. 4H illustrate a graphical user interface according to an embodiment.

Figure 5:
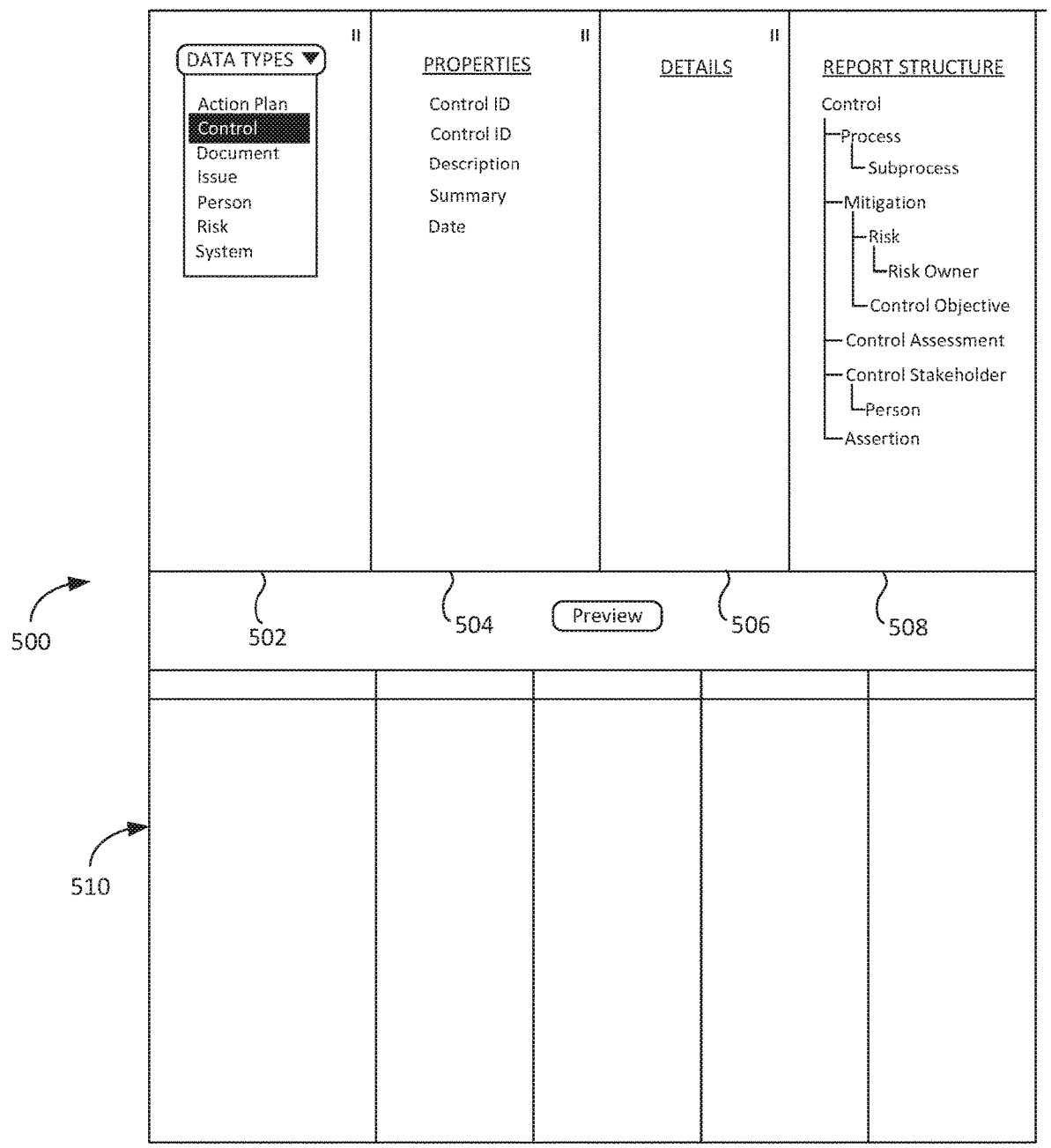

FIG. 5 illustrates an example of a graphical user interface implemented according to another embodiment.

Figure 6:
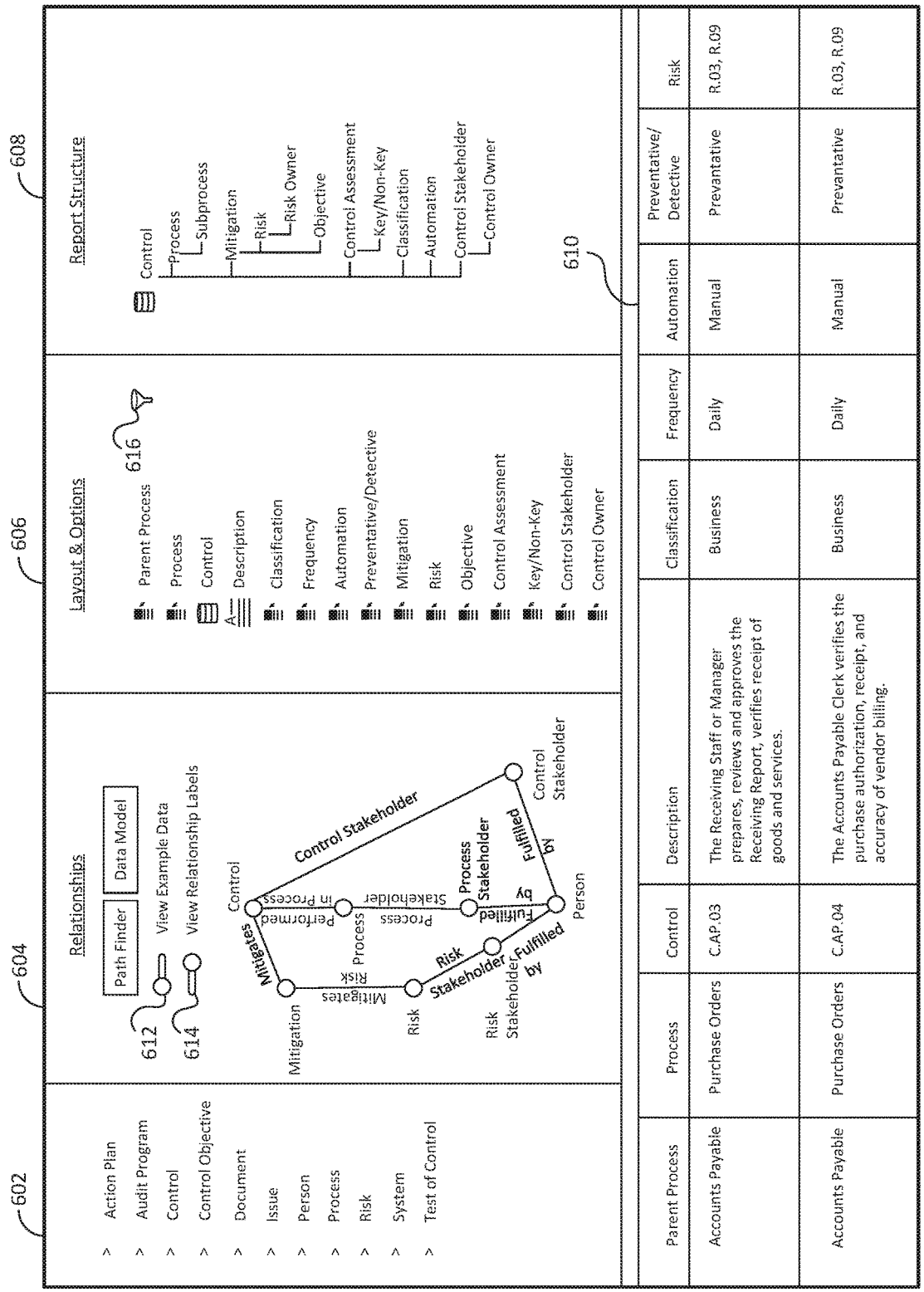

FIG. 6 illustrates another example of a graphical user interface implemented according to still another embodiment.

Figure 7A:
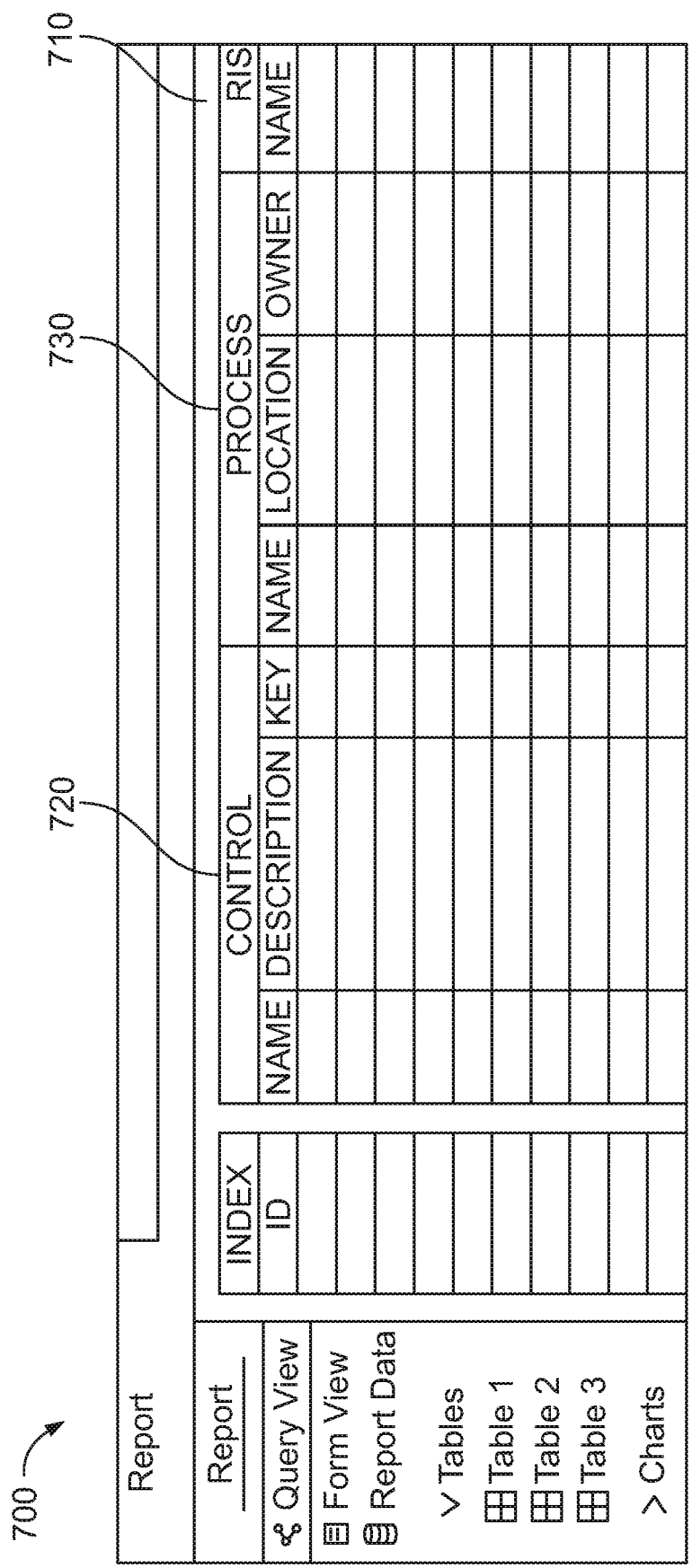
Figure 7B:
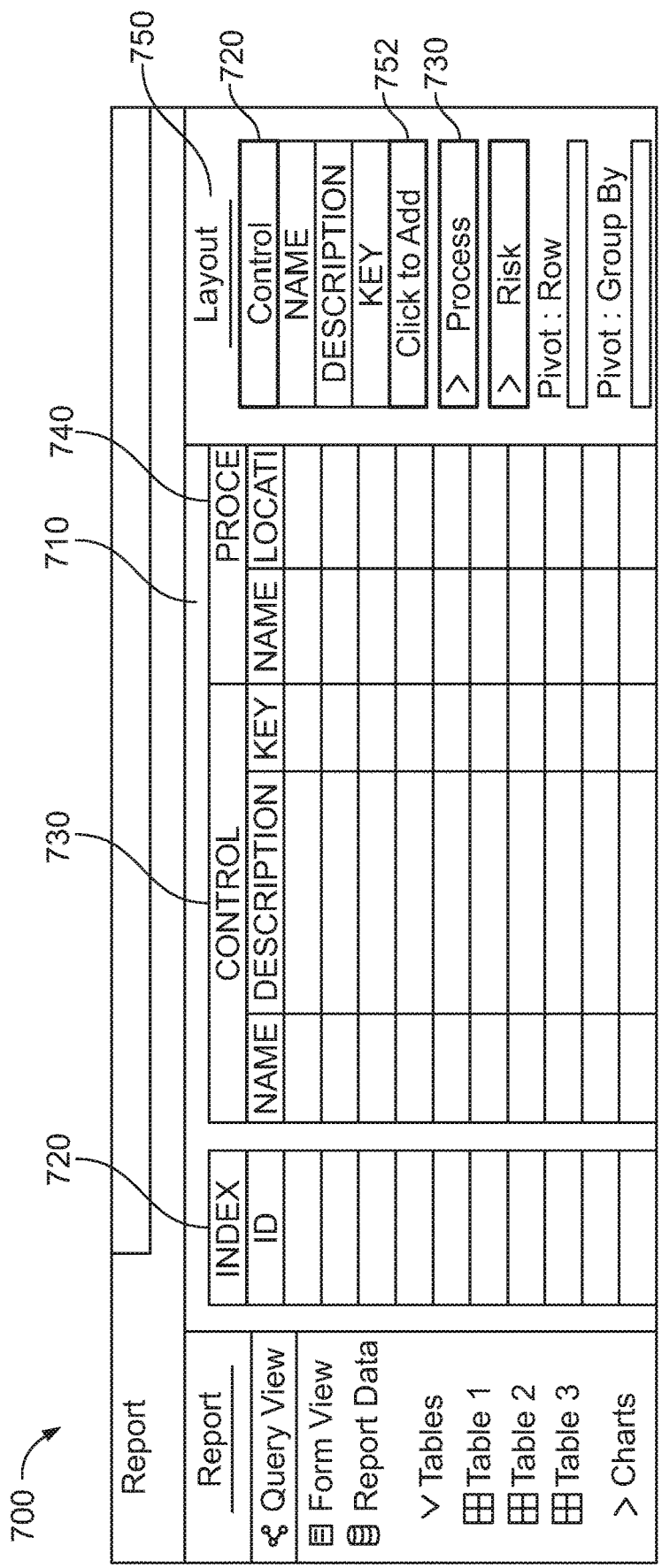

FIG. 7A and FIG. 7B illustrate an example of a graphical user interface implemented according to yet another embodiment.

DESCRIPTION

Described herein are a method and computing device (also referred to a "first computing device" or "server") that allows a first user (acting through a second computing device, which may also be referred to as a "first client device") to easily form graph database search queries by presenting a user interface that exposes the relevant characteristics of the database (e.g., vertices, properties of vertices, and edges) in a way that does not require the user to understand the underlying structure of the database.

In an embodiment, a method for generating a search query for a graph database includes displaying a list of vertex properties on a user interface; receiving, via the user interface, a selection of one or more of the displayed vertex properties; forming a graph database query based on selection; and displaying a report containing a result of the query.

According to an embodiment, the method further includes displaying a list of vertex types; and receiving, via the user interface, a selection of a vertex type from the list, wherein the displayed list of vertex properties includes one or more properties of the selected vertex type and one or more properties of vertex types with which the selected vertex type has an edge relationship.

In an embodiment, the method further includes displaying a list of vertex types; receiving a user selection of a vertex type from the list; and displaying a list of edge types for which the selected vertex type is a source, wherein the displayed list of vertex properties includes one or more properties of the selected vertex type and one or more properties of target vertices of the displayed edge types.

According to an embodiment, each of the displayed list of edge types is expandable to display the one or more properties of the target vertices.

In an embodiment, the method further includes: as each of the one or more properties is selected, displaying a column for the selected property in a shell report on the user interface.

According to an embodiment, the method further includes, for at least one of the selected properties, receiving a user request to edit a column heading corresponding to the selected property, wherein displaying the report includes displaying the column heading corresponding to the selected property in accordance with the user request In an embodiment, the method further includes: receiving, via the user interface, a user entry of text; conducting a search for vertex types based on the text; displaying a list of vertex types based on a result of the search; and receiving a user selection of a vertex type from the list of vertex types, wherein displaying the list of vertex properties includes displaying one or more vertex properties of the selected vertex type and displaying one or more vertex properties of vertex types with which the selected vertex type has an edge relationship.

According to an embodiment, a method for generating a search query for a graph database includes: displaying a user interface comprising a first pane including a list of user-selectable properties of a first vertex type and a list of user-selectable properties of a second vertex type with which the first vertex type has an edge relationship, and a second pane; receiving, via the user interface, a selection of a subset of the properties of the first vertex type; receiving, via the user interface, a selection of a subset of the properties of the second vertex type; forming a query of the graph database based on the selected subset of the properties of the first vertex type and the selected subset of the properties of the second vertex type; and displaying, in the second pane, a preview of a report generated based on a result of the query.

In an embodiment, the method further includes: displaying, in the first pane, an edge type whose source vertex is of the first vertex type and whose target vertex is of the second vertex type; and displaying the user-selectable properties of the second vertex type under the displayed edge type.

According to an embodiment, the method further includes receiving a user selection of the edge type; and in response to the user selection of the edge type, expanding the displayed edge type to show the user-selectable properties of the second vertex type.

In an embodiment, the method further includes: displaying, in the second pane, a shell of the report; as the selection for each property of the first vertex type and the second vertex type is received, adding, to the shell, a column whose header is the name of the property, wherein displaying the preview of the report includes populating the shell with the result of the query.

According to an embodiment, the method further includes displaying, in a third pane, a tree representation of the edge relationship between the first vertex type and a plurality of other vertex types, including the second vertex type.

In an embodiment, the method further includes receiving a request to edit a column heading corresponding to a property of the selected subset of the first vertex type or to a property of the selected subset of the second vertex type; wherein displaying the preview of the report includes displaying the column heading corresponding to the property in accordance with the request.

According to an embodiment, a method for generating a search query for a graph database involves: displaying, on a user interface, a graphical representation of a plurality of vertex types and a plurality of edge types for a graph database; receiving, via the user interface, a selection from the graphical representation of at least one of the plurality of vertex types and at least one of the plurality of edge types; forming a query of the graph database based on the selections; and displaying a report containing a result of the query.

In an embodiment, the method further includes: receiving, via the user interface, an input indicating that edge labels are to be displayed; and displaying an edge label for each of the displayed edge types.

According to an embodiment, the method further includes displaying, on the user interface, a list of columns to be displayed in the report; receiving a user gesture indicating a reordering of the list of columns; and displaying the report in accordance with the reordered list.

In an embodiment, the method further includes displaying, on the user interface, a list of edge types or vertex types to be used in the query; receiving, via the user interface, an input indicating a vertex type or edge type of the list that is to be optional, wherein the query excludes results for which the selected vertex type and the selected edge type does not exist, except for results in which the selected vertex type or selected edge type has been indicated to be optional.

Figure 1:
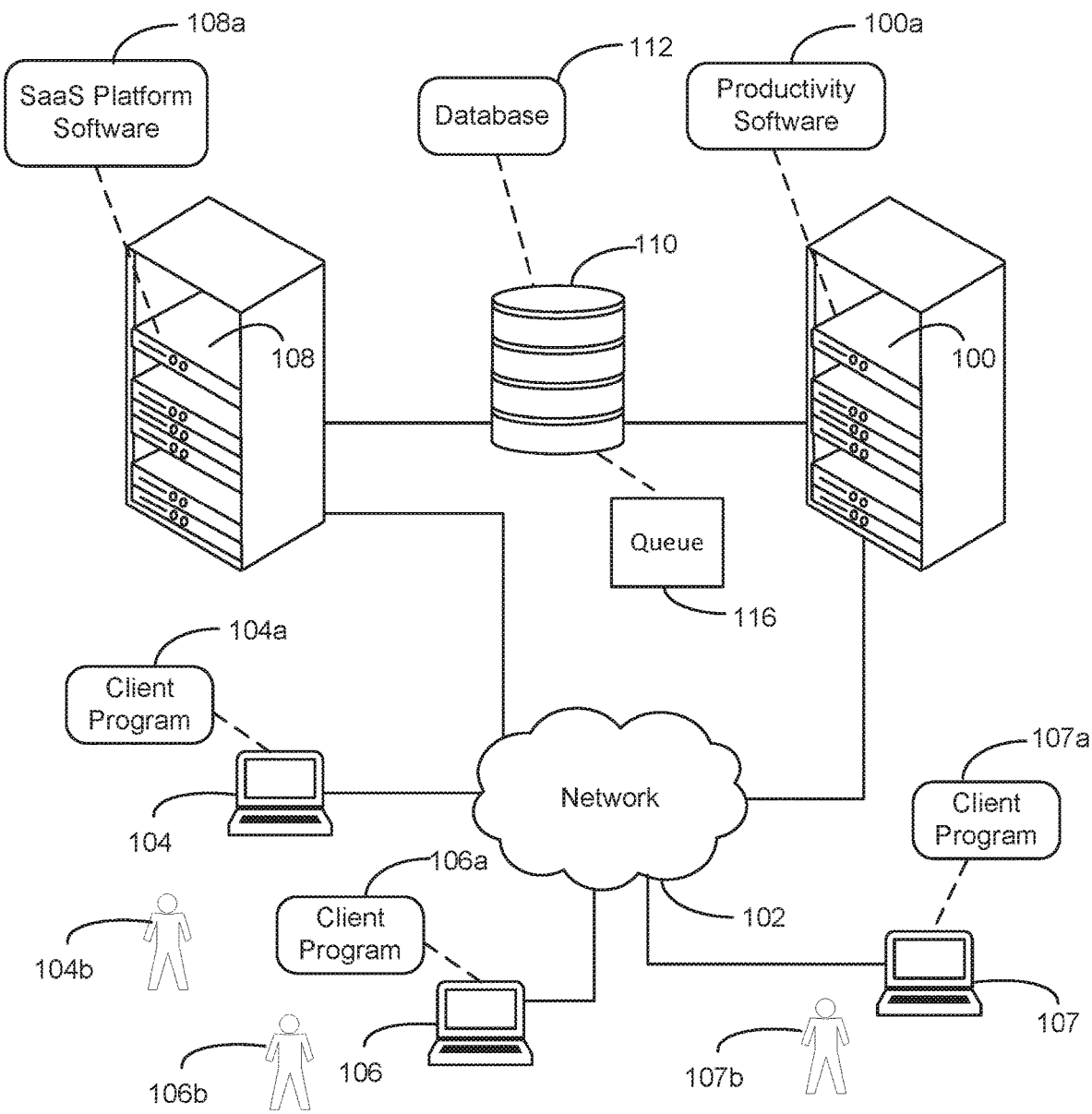
FIG. 1 is a block diagram illustrating an example networking environment in which various embodiments of the disclosure may be employed.

Various embodiments of the disclosure are implemented in a computer networking environment. Turning to FIG. 1, an example of such an environment is shown. A first computing device 100 (e.g., a hardware server device ("server" or "server device") or a cluster of hardware server devices) is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104 (e.g., a first client device), a third computing device 106 (e.g., a second client device), a fourth computing device 107 (e.g., a third client device), and a fifth computing device 108 (e.g., a server or a cluster of servers, also referred to herein as "SaaS server"). For the sake of the various examples described herein, a first user 104b is assumed to operate the second computing device 104, a second user 106b is assumed to operate the third computing device 106, and a third user 107b is assumed to operate the fourth computing device 107. It should be noted that the networking environment may include any number of computing devices (e.g., hundreds of client devices) and the number depicted in FIG. 1 is meant only to be representative.

It is to be understood that various embodiments may be carried out on the first computing device 100, the second computing device 104, the third computing device 106, the fourth computing device 107, or other computing devices not depicted, with one or more of the second computing device 104, the third computing device 106, and the fourth computing device 107 accessing the first computing device 100 via client programs (labeled 104a, 106a, and 107a respectively), such as thin, web-based clients. In an embodiment, the first computing device 100 executes productivity software 100a (e.g., a document editing application, a spreadsheet application, etc.) and the fifth computing device 108 executes software-as-a-service ("SaaS") platform software 108a. The first computing device 100 and the fifth computing device 108 are communicatively linked to a media storage device 110 (e.g., a memory or a redundant array of independent disks). Although FIG. 1 depicts the media storage device 110 as a single device, in fact, the media storage device 110 may be implemented as a single computing device or as multiple computing devices working together, and may represent a cloud storage service including multiple storage devices.

In another embodiment, the productivity software 100a and the SaaS platform software 108a execute on the same computing device (e.g., the first computing device 100 or the fifth computing device 108). For example, the productivity software 100a could reside on one partition of the first computing device 100 while the SaaS platform software 108a could reside on another partition of the first computing device 100. In other embodiments, portions of the productivity software 100a execute on both the first computing device 100 and one or more of the second, third, and fourth computing devices 104, 106, and 107 and/or portions of the SaaS platform software 108a may be executed on both the first computing device 100 and the fifth computing device 108. With such network configurations, the second computing device 104, the third computing device 106, and the fourth computing device 107 are configured to access the computing device or devices on which the productivity software 100a resides.

Stored on the media storage device 110 is a graph database 112, which is maintained by the SaaS platform software 108a, but whose operations are controlled by the productivity software 100a, which issues instructions to read from, write to, and modify the contents of the database 112 via the SaaS platform software 108a. The graph database 112 include data structures such as vertices and edges, in which each vertex may have one or more properties and each edge connects a source vertex to a target vertex. A source vertex and a target vertex connected by an edge are said to have an edge relationship.

Figure 2:
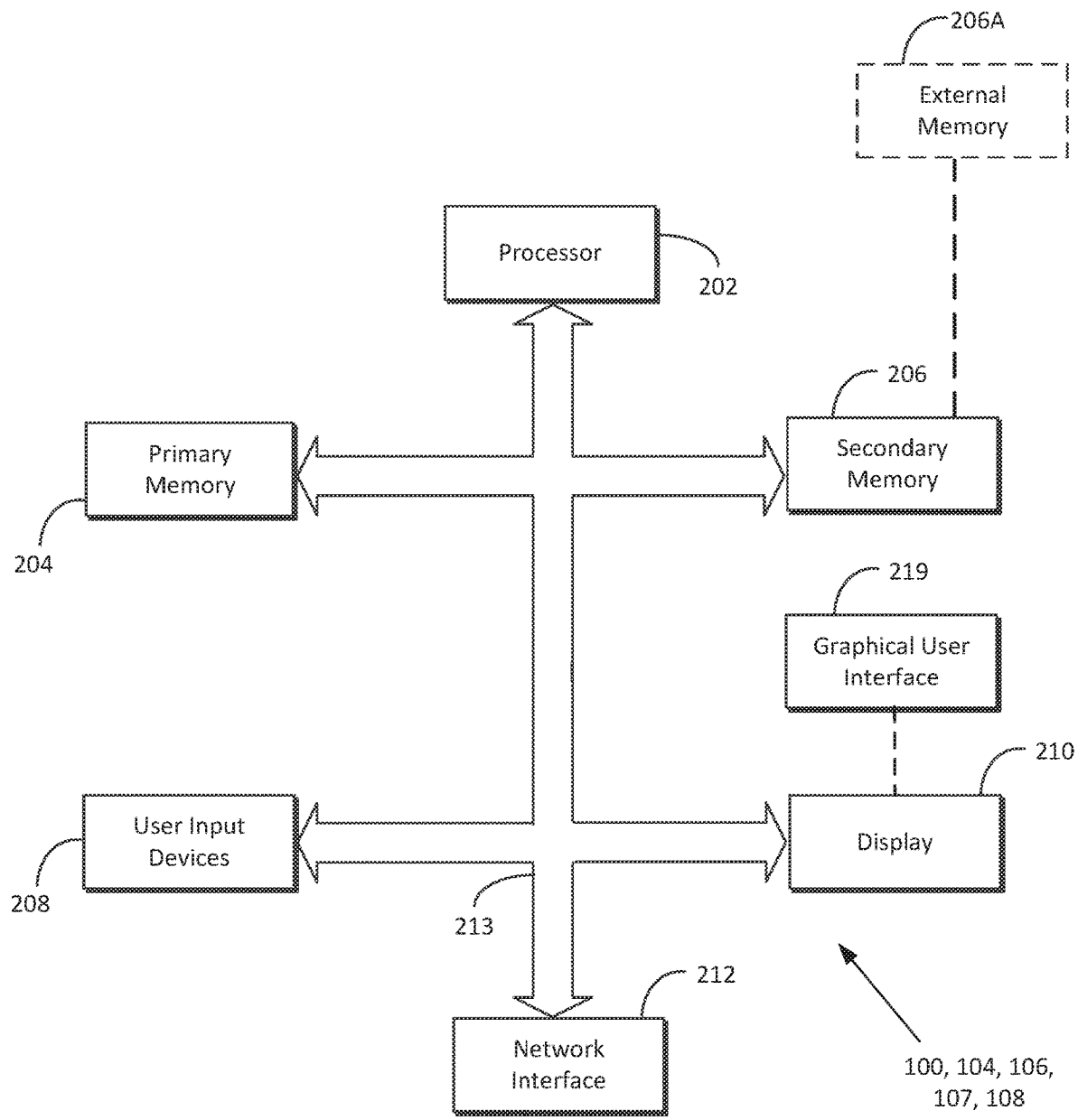
FIG. 2 is a block diagram of a computing device, according to an embodiment.

In one implementation, one or more of the computing devices of FIG. 1 (including the media storage device 110) have the general architecture shown in FIG. 2. The computing device of FIG. 2 includes processor hardware 202 (e.g., a microprocessor, controller, or application-specific integrated circuit) (hereinafter "processor 202"), a primary memory 204 (e.g., volatile memory, random-access memory), a secondary memory 206 (e.g., non-volatile memory), user input devices 208 (e.g., a keyboard, mouse, or touchscreen), a display device 210 (e.g., an organic, light-emitting diode display), and a network interface 212 (which may be wired or wireless). Each of the elements of FIG. 2 is communicatively linked to one or more other elements via one or more data pathways 213. Possible implementations of the data pathways 213 include wires, conductive pathways on a microchip, and wireless connections. In an embodiment, the processor 202 is one of multiple processors in the computing device, each of which is capable of executing a separate thread. In an embodiment, the processor 202 communicates with other processors external to the computing device in order to initiate the execution of different threads on those other processors.

Referring still to FIG. 2, the memories 204 and 206 store instructions executable by the processor 202 and data. The term "local memory" as used herein refers to one or both the memories 204 and 206 (i.e., memory accessible by the processor 202 within the computing device). In some embodiments, the secondary memory 206 is implemented as, or supplemented by an external memory 206A. The media storage device 110 is a possible implementation of the external memory 206A. The processor 202 executes the instructions and uses the data to carry out various procedures including, in some embodiments, the methods described herein, including displaying a graphical user interface 219. The graphical user interface 219 is, according to one embodiment, software that the processor 202 executes to display a report on the display device 210, and which permits a user to make inputs into the report via the user input devices 208.

This disclosure will sometimes refer to one or more of the client program 104a, the client program 106a, the productivity software 100a, the first computing device 100, the second computing device 104, and the third computing device 106 as taking one or more actions. It is to be understood that such actions may involve one or more of the client program 104a, the client program 106a, and the productivity software taking such actions as: (a) the client program transmitting hypertext transport protocol commands such as "Get" and "Post" in order to transmit to or receive information from the productivity software 100a (e.g., via a web server), and (b) the client program running a script (e.g., JavaScript) to send information to and retrieve information from the productivity software 100a. The productivity software 100a may ultimately obtain information (e.g., web pages or data to feed into plugins used by the client programs) from the database 112 or the SaaS platform software 108a. It is to be understood, however, that when a computing device (or software executing thereon) carries out an action, it is the processor hardware 202 (the main processor and/or one or more secondary processors, such as a graphics processing unit, hardware codec, input-output controller, etc.) that carries out the action at the hardware level.

The disclosure will also refer to actions taking place via a user interface. There are various ways in which this takes place. In an embodiment, a client program on a client computing device (such as one of the computing devices 104, 106, and 107 of FIG. 1) presents a user interface, which it receives from the productivity software 100a. A user interacts with the user interface, and the client computing device transmits the user's input to the productivity software 100a, which responds to the user's input via the client program.

Figure 3:
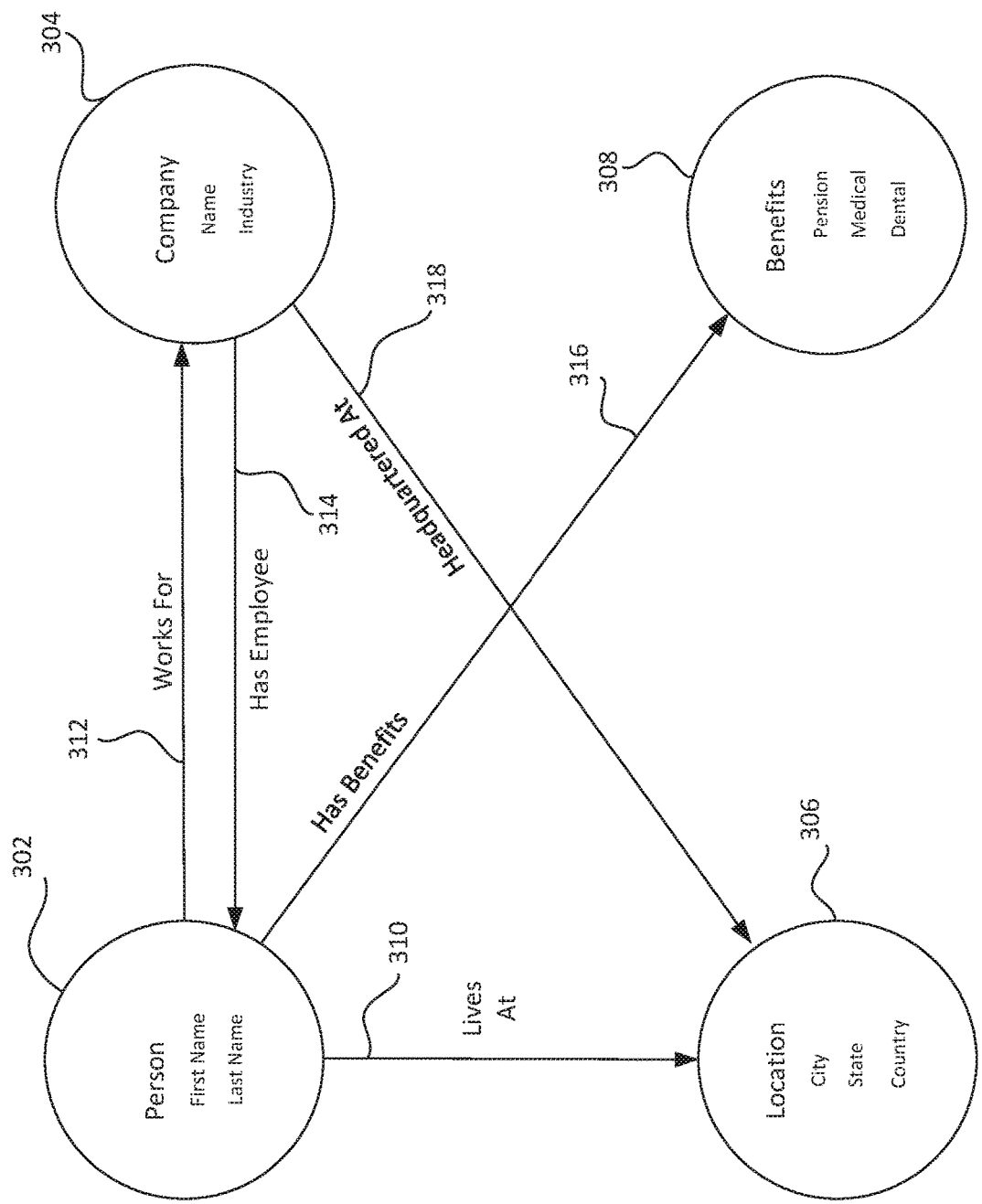
FIG. 3 illustrates the structure of an example graph database.

FIG. 3 shows an example structure for the database 112, which will be used to help illustrate the example use case of FIGS. 4A through 4H. The database 112 in this example is a graph database that includes a number of instances of different types of vertices and different types of edges. Each edge has a source vertex (where the edge originates) and a target vertex (where the edge terminates). The vertex types include a first vertex 302 (representing a person—also referred to as a "person vertex"), a second vertex 304 (representing a company—also referred to as a "company vertex"), a third vertex 306 (representing a location—also referred to as a "location vertex"), and a fourth vertex (representing employee benefits—also referred to as a "benefits vertex"). The possible edges that can originate from a person vertex 302 include a Lives At edge 310 (which has a location vertex 306 as its target), a Works For edge 312 (which has a company vertex 304 as its target), and a Has Benefits edge 316 (which has a benefits vertex 308 as its target). The possible edges that can originate from a company vertex 304 includes a Has Employee edge 314 (which has a person vertex 302 as its target).

Each type of vertex shown in FIG. 3 has properties. For example, a person vertex 302 has the properties First Name and Last Name; a company vertex 304 has the properties Name and Industry; a location vertex has the properties City, State, and Country; and a benefits vertex has the properties Pension, Medical, and Dental.

In an embodiment, a first computing device (e.g., the server device 100) receives input from a second computing device (e.g., one of the client devices) indicating the type of report that a user wants to be generated. The user provides this input via a simple and intuitive user interface that shows the user, in effect, which vertex types are available (without exposing the user to the complex concepts involved in graph databases), what relationships those vertex types have with other vertices (i.e., the edges), and which vertex properties are available for building a report. In response to this input, the first computing forms a query to be run on the database 112 for the purpose of generating a report and displaying the report on the client device through which the user submitted the input.

Turning to FIGS. 4A-4H, a user interface according to an embodiment will now be described. The user interface, generally labeled 400, includes a first panel 402, a second panel 404, and a third panel 406. The first panel 402 includes a search box 408 that allows a user to search for a particular vertex type (i.e., the source vertex) and a pull down menu 410 that allows the user to select a source vertex type from a list of available vertex types. The second panel 404 includes a preview button 412 which, when pressed, prompts the server device 100 to generate a preview of a report based on the vertex types selected in the first panel 402 and to display the report preview in the second panel 404. The third panel 406 lists the order of the columns of the report and allows the user to reorder them as desired.

To initiate the process of building a report according to an embodiment, the user activates the drop down menu 410 (FIG. 4B) and selects vertex type. Note that the available vertex types are those shown in FIG. 3. For the purposes of this example, it will be assumed that the user chose the "person" vertex type. In response to the selection, the server device 100 displays, in the first panel 402 (FIG. 4C), the properties of a vertex of type "person" and the possible edge types that can originate from a person vertex. Each of the properties is selectable and each of the edge types is expandable. When the user expands an edge type, the server device 100 lists the properties the target vertex as shown in FIG. 4D (in which all of the edge types have been expanded).

Figure 4A:
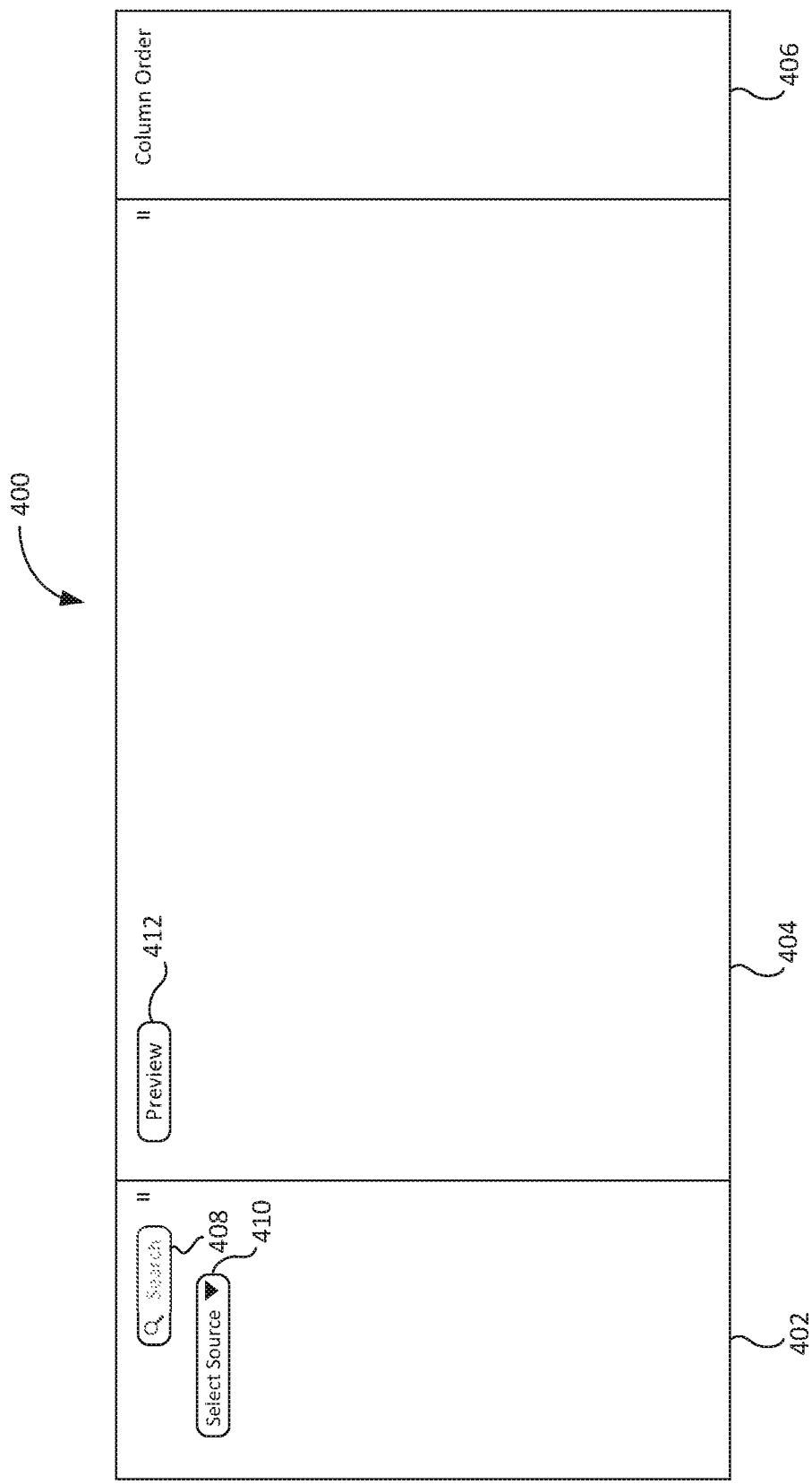
Figure 4B:
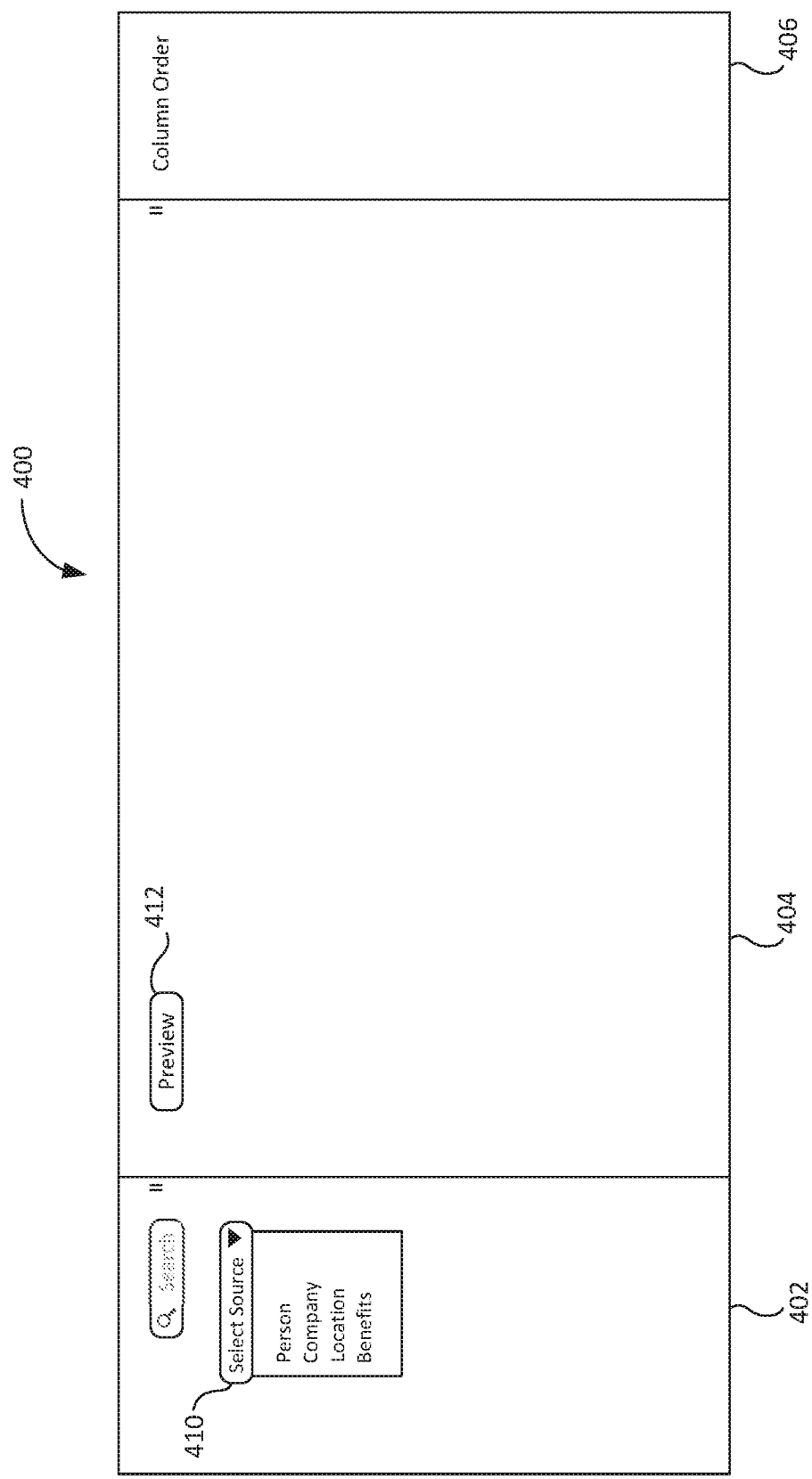
Figure 4C:
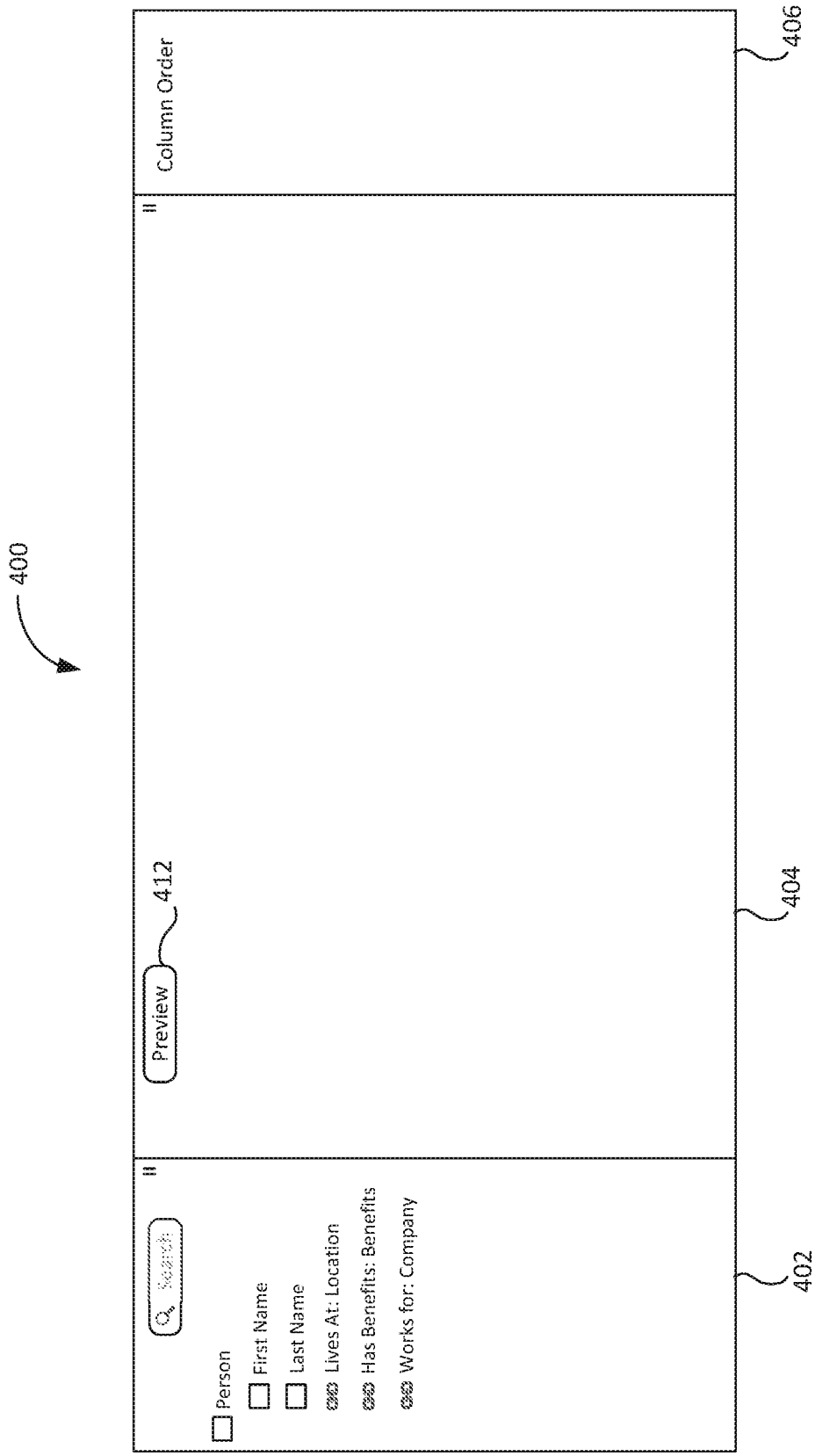
Figure 4E:
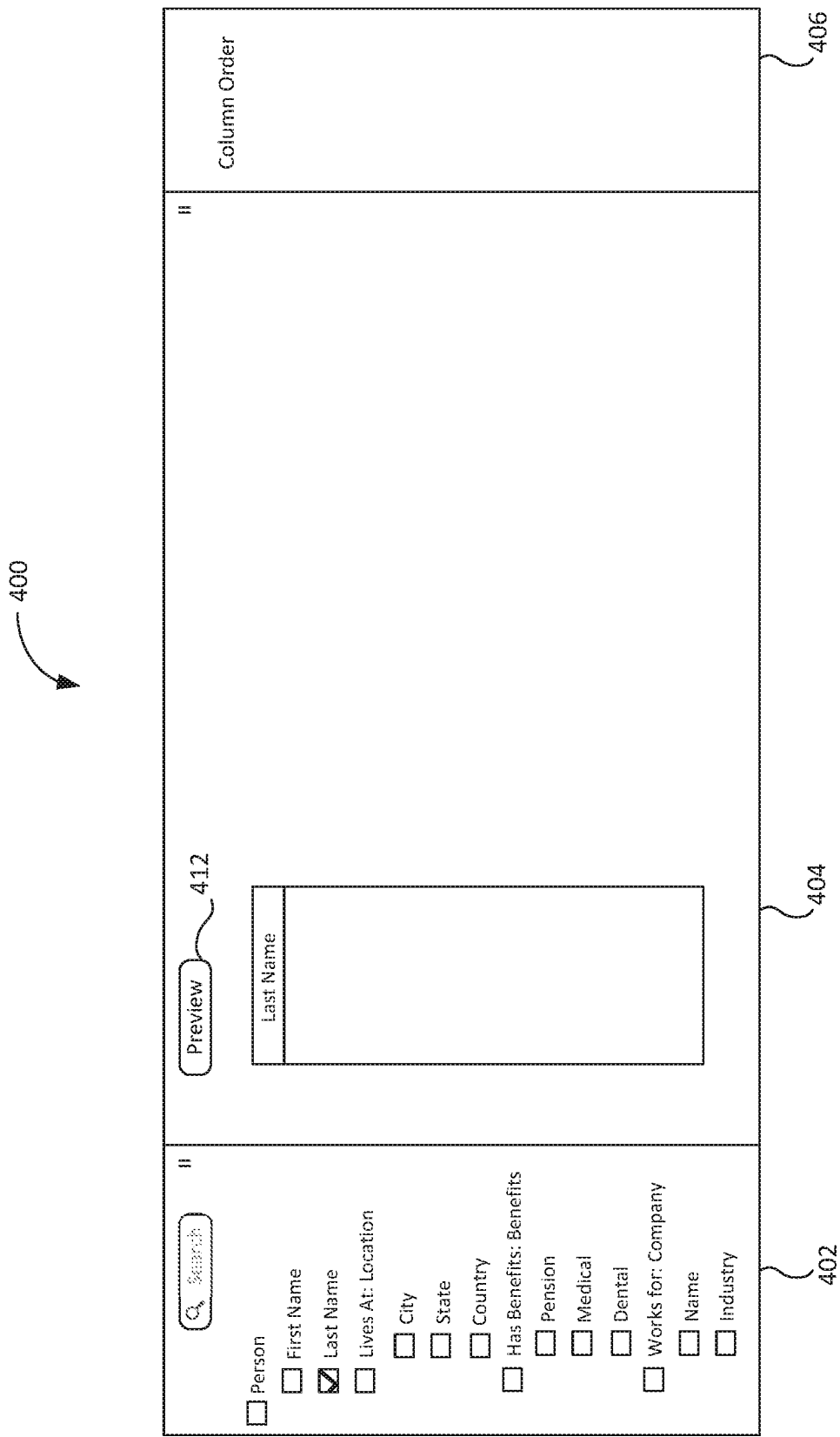

In an embodiment, in response to each selection of a vertex property by the user, the server device 100 displays, in the second panel 404, a shell report showing the columns that would result from the selected properties. These columns appear one by one as the user makes the selections, as can be seen in FIG. 4E (in which the Last Name property is selected) and in FIG. 4F (in which the State property has been selected). The order of the columns resulting from the selected properties is shown in FIG. 4F.

Figure 4G:
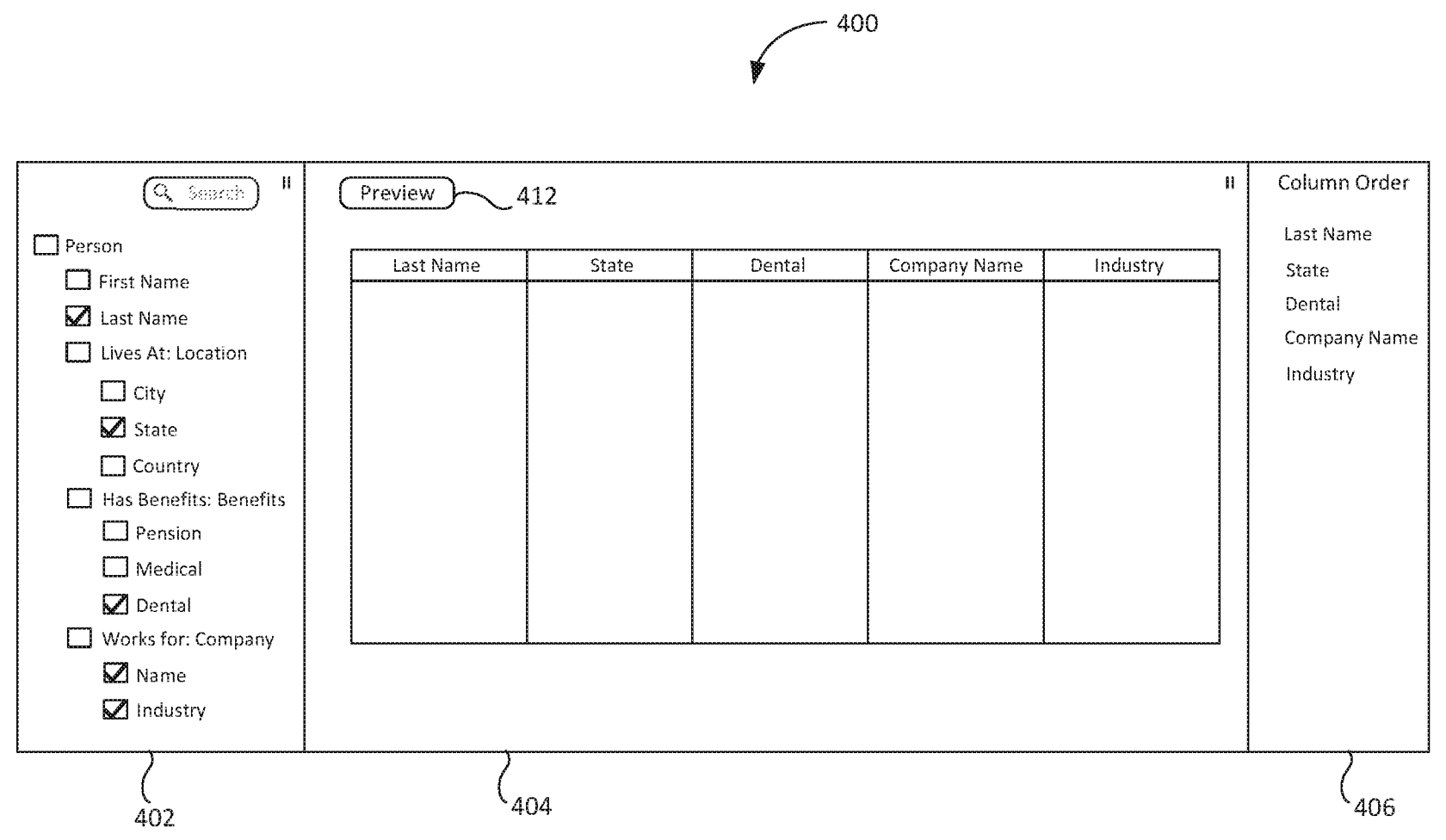

Turning to FIG. 4G, it will now be assumed that the user has selected all of the properties they wish to select (Last Name, State, Dental, Company Name, Industry). In effect, what the user is requesting is a report that shows people, which state they live in, what their dental benefits are (if any), the company they work for, and the industry that the company is in. The user may now activate the preview button 412, which causes the client device to form a query data structure and to transmit the query to the server device 100. In response to the request, the server device 100 forwards the query to the SaaS server 108. In the case of FIG. 4G, the query data structure may be represented as a textual query that may look as follows.

Person(person);
(person)>lives_at:Location(location);
(person)>has_benefits:Benefits(benefits);
(person)>works_for: Company(company);
person.lastName "Last Name";
location. state "State";
benefits. dental "Dental";
company.name "Name";
company. industry "Industry";

Once the results of the query are returned by the SaaS server 108 to the server device 100, the server device 100 displays the report in the second panel 404 as shown in FIG. 4H.

According to an embodiment, the user interface 400 also provides filters for the report. In one implementation, a user can execute a gesture (e.g., a right click) at any column header in the report, to which the user interface 400 responds by presenting a selectable list of results found in that column. The user may then select which results are to be shown in the report on that basis. In response to the selections, the server device 100 forms a new query (with the appropriate filtering parameters included), sends the new query to the SaaS server 108, receives the search results back, and presents an updated report in the second panel 404 (reflecting the applied filters).

In an embodiment, the user interface 400 gives the user the ability to insert annotations into the query, which alter how the report is to be displayed. From the user's point of view, the action required may be as simple as performing a right-click on a property or on an edge type (from the first panel 402) to activate a menu of options. Examples of possible options for a property include: (1) Edit Column Header, which allows the user to change the column header that appears in the report from the default (the property name) to something else. For example, the column header for the "Dental" property could be changed to "Dental Insurance Carrier." (2) Sort Ascending/Descending, which allows the report to be sorted (e.g., an ascending sort to be applied or a descending sort to be applied. based on a particular column (either ascending or descending). (3) Hidden, which hides the column corresponding to the property in the report. (4) Edit as Relationship, which sets the default editing behavior of the data that will be displayed in the column to switch relationships, rather than edit the text of the property. (5) Collapse Values, which concatenates the different vertex branches below this step into a single branch, resulting in comma separated values within a single cell. For example in this report if a person works for a company with more than one industry, rather than displaying them on multiple rows, they would exist in one row, within the same cell.

According to an embodiment, when a user selects an edge type to be part of a report, the edge type is represented as a column (the cells may include the "display name" of the target vertex). The column header may default to the target vertex type but can be overwritten with a custom header (e.g., via a user gesture such as a right-click).

Examples of possible options for an edge type include: (1) Edit Column Header, which allows the user to change the column header that appears in the report from the default (the index name of the vertex) to something else. For example, the column header for the "Company" vertex could be changed to "Works for Company." (2) Optional, which makes the edge optional. Thus, if a selected property under the edge does not exist for a particular search result, then the result will still be displayed. For example, the report shown in the second panel 402 in FIG. 4H lists person Piccoli as having no dental plan. If the edge Has Benefits is not set to "Optional," then person Piccoli would not be shown in this report.

Turning to FIG. 5, a graphical user interface configured according to another embodiment will now be described. The user interface, generally labeled 500, includes a first panel 502 for selecting from among a number of vertex types, a second panel 504 that displays properties for the selected vertex, a third panel 506 that displays options related to the selected vertex for filtering, optional, collapsed, and hidden, as well as a relationship pathfinder tool to help the user with discerning which data path they want to use when adding a data type that could have multiple traversals, and a fourth panel 508 that shows the possible target vertices for the edges that connect to the selected vertex type. The user interface 500 also includes a fifth panel 510 in which a report preview may be displayed. Otherwise, the functionality of the user interface 500 is the same as that of the user interface 400.

Turning to FIG. 6, a graphical user interface implemented according to another embodiment will now be described. The user interface, generally labeled 600, facilitates generation of a report by making the structure of the underlying graph database more transparent and at least partially selectable. The user interface 600 includes a first panel 602 that allows a user to select an index (a vertex type upon which to base the user's selection of columns) for generating a report, a second panel 604 that displays a user-selectable representation of possible vertices and edges that may be included in the report, a third panel 606 that lists the columns in the report and gives the option control the layout of the report (e.g., sort and filter columns), and a fourth panel 608 that shows the structure of the report in the form of a tree. The user interface 600 further includes a fifth panel 610 that displays a preview of the report.

To illustrate how the user interface 600 facilitates the generation of a report, an example user case will now be described. In this example, the underlying graph database is one that is being used as part of a financial audit process, and the user wishes to generate a report to match up controls with corresponding stakeholders, who are individual persons in this case. Thus, in the first panel 602, the user selects "control" as the report index and selects "person" as the target.

In order to view at least part of the structure of the underlying graph database relevant to "control" and "person" vertex types, in the second panel 604 (e.g., when the user selects the control labeled "path finder") a representation of a control vertex is displayed. When the user interacts (e.g., touching or mouse-clicking) with the representation of the control vertex, the user interface 600 responds by showing edges and further vertices to which the edges are connected. This allows the user to see which further columns may possibly be added to the report. By a more definitive selection (e.g., a second touch or mouse-click), the user can select which additional columns are to be added. Furthermore, in response to user activation of a first on-screen control 612 or a second on-screen control 614 (which are depicted as sliders), the user interface 600 displays example vertex data (not depicted in FIG. 6) or toggle the display of edge labels on or off, respectively.

One possible way for the user to reorder the columns of the report is by moving the various items in the list shown in the third panel 606 up or down. Additionally, by interacting with a filter icon 616, the user interface 600 can receive a user input or selection of filters to apply to the report and change, for example, which columns are hidden or which vertex or edges are optional. A vertex or edge in the list is "optional" if it is not required to exist for the corresponding search result to be shown in the report. For example, if a "risk" vertex is indicated (e.g., via user input) to be optional, and one of the results is control for which a risk has not yet been assigned, then the corresponding row of the report will simply have an empty cell under (i.e., whether the particular vertex represented by the column needs to exist for the corresponding row to be included in the report). Otherwise, if the risk vertex is not optional and a potential search result does not have a risk vertex, then the result will not, in fact, be a result (because the query will be formed in such a way to make the "risk" vertex mandatory) or the result will be excluded from the report. Other ways of reordering columns include dragging them to the desired location.

Turning to FIGS. 7A and 7B, a graphical user interface implemented according to still another embodiment will now be described. The user interface, generally labeled 700, allows properties to be grouped by vertex types to facilitate review of the report. The user interface 700 includes a first panel 710 that displays a preview of the report. The first row of the preview of the report includes a number of superheaders, which are vertex types under which various properties may be grouped. The second row of the preview of the report includes various properties to be included in the report. In FIG. 7A, a superheader 720 has the "Control" vertex type and includes a group of columns whose properties they represent are associated with the "Control" vertex type. In this case, three of the selected properties are associated with the "Control" vertex type: "Name", "Description", and "Key". Another superheader 730 has the "Process" vertex type and includes a group of columns represented three properties: "Name", "Description", and "Owner". Superheaders allow a user to group the properties in the report according to the vertex types of the properties and help distinguish properties with similar display names (e.g., "Name" is a property under the Control superheader 720 and under the Process superheader 730). In various embodiment, the user interface 700 may apply different formatting to distinguish the superheaders from one another (e.g., text color, background color or style, etc.).

According to another embodiment, the user interface 700 includes a second panel 750, which displays the layout of the report. The layout panel 750 displays the Control superheader 720 and the Process superheader 730. The Control superheader 720 is expanded to show the properties "Name", "Description", and "Key" of the vertex type "Control". The Control superheader 730 further includes a property selector 752 to facilitate the addition of another property. For example, a user may click on a property selector 752 to add a property of the vertex type "Control" to the layout panel 750 and to the report. In the layout panel 750, the Process superheader 730 is collapsed and the properties having the Process vertex type are hidden. A user may view the properties under the Process superheader 730 by expanding the Process superheader 730.

In an embodiment, the user interface 700 may automatically group properties according to their vertex types and display the corresponding superheaders. Alternatively, the user interface 700 may include a button or selector that a user can toggle or select to switch on the superheaders. In other embodiments, the superheaders are not shown as a separate row in the report, but the vertex type of a property is shown when the property is selected in the report (e.g., when a cursor is hovered over the property in the report). In yet another embodiment, the superheaders or vertex types are displayed in the report even when the properties are not grouped by their vertex types.

According to an embodiment, superheaders and their associated group of columns may be moved/reordered in the manner described above with respect to individual columns. For example, by dragging the Process superheader 730 to the left, the superheaders of FIG. 7A could be reordered so that the Process superheader and the Name, Location, Owner, and Name property columns would appear to the left of the Control superheader 720 and its associated property columns.

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope as set forth in the following claims. For example, the actions described herein can be reordered in ways that will be apparent to those of skill in the art.

What is claimed is:

1. A method for generating a search query for a graph database, the graph database being structured as a plurality of vertices, each of the plurality of vertices having at least one edge relationship with another vertex of the plurality of vertices, the method comprising:
    displaying a user interface comprising,
        a first pane including a list of user-selectable properties of a first vertex type of the plurality of vertices of the graph database and a list of user-selectable properties of a second vertex type of the plurality of vertices of the graph database with which the first vertex type has an edge relationship in the graph database, and
        a second pane;
    receiving, via the user interface, a selection of a subset of the properties of the first vertex type;
    receiving, via the user interface, a selection of a subset of the properties of the second vertex type;
    forming a query of the graph database based on the selected subset of the properties of the first vertex type and the selected subset of the properties of the second vertex type; and
    displaying, in the second pane, a preview of a report generated based on a result of the query,
    wherein displaying a preview of the report comprises displaying a plurality of columns organized into a first group representing the first vertex type and a second group representing the second vertex type.

2. The method of claim 1, further comprising:
displaying, in the first pane, an edge type whose source vertex is of the first vertex type and whose target vertex is of the second vertex type; and
displaying the user-selectable properties of the second vertex type under the displayed edge type.

3. The method of claim 2, further comprising:
receiving a user selection of the edge type; and
in response to the user selection of the edge type, expanding the displayed edge type to show the user-selectable properties of the second vertex type.

4. The method of claim 1, further comprising,
displaying, in the second pane, a shell of the report;
as the selection for each property of the first vertex type and the second vertex type is received, adding, to the shell, a column whose header is the name of the property,
wherein displaying the preview of the report comprises populating the shell with the result of the query.

5. The method of claim 1, further comprising displaying, in a third pane, a tree representation of the edge relationship between the first vertex type and a plurality of other vertex types of the plurality of vertices, including the second vertex type.

6. The method of claim 1, further comprising:
receiving a request to edit a column heading corresponding to a property of the selected subset of the properties of the first vertex type or to a property of the selected subset of the properties of the second vertex type;
wherein displaying the preview of the report comprises displaying the column heading corresponding to the property in accordance with the request.

7. The method of claim 1,
wherein the first group includes columns representing the selected subset of the properties of the first vertex type, and
wherein the second group includes columns representing the selected subset of the properties of the second vertex type.

8. The method of claim 1, further comprising:
receiving, via the user interface, an input indicating a filter to be applied; and
configuring the report according to the filter.

9. The method of claim 1, further comprising:
receiving, via the user interface, an input indicating a sort to be applied; and
configuring the report according to the sort.

10. A computing device comprising a processor, wherein the processor is configured to carry out a method for generating a search query for a graph database structured as a plurality of vertices, each of the plurality of vertices having at least one edge relationship with another vertex of the plurality of vertices, the method comprising:
displaying a user interface comprising,
a first pane including a list of user-selectable properties of a first vertex type of the plurality of vertices of the graph database and a list of user-selectable properties of a second vertex type of the plurality of vertices of the graph database with which the first vertex type has an edge relationship in the graph database, and a second pane;
receiving, via the user interface, a selection of a subset of the properties of the first vertex type;
receiving, via the user interface, a selection of a subset of the properties of the second vertex type;
forming a query of the graph database based on the selected subset of the properties of the first vertex type and the selected subset of the properties of the second vertex type; and
displaying, in the second pane, a preview of a report generated based on a result of the query,
wherein displaying a preview of the report comprises displaying a plurality of columns organized into a first group representing the first vertex type and a second group representing the second vertex type.

11. The computing device of claim 10, wherein the method carried out by the processor further comprises:
displaying, in the first pane, an edge type whose source vertex is of the first vertex type and whose target vertex is of the second vertex type; and
displaying the user-selectable properties of the second vertex type under the displayed edge type.

12. The computing device of claim 11, wherein the method carried out by the processor further comprises:
receiving a user selection of the edge type; and
in response to the user selection of the edge type, expanding the displayed edge type to show the user-selectable properties of the second vertex type.

13. The computing device of claim 10, wherein the method carried out by the processor further comprises:
displaying, in the second pane, a shell of the report; and
as the selection for each property of the first vertex type and the second vertex type is received, adding, to the shell, a column whose header is the name of the property,
wherein displaying the preview of the report comprises populating the shell with the result of the query.

14. The computing device of claim 10, wherein the method carried out by the processor further comprises displaying, in a third pane, a tree representation of the edge relationship between the first vertex type and a plurality of other vertex types of the plurality of vertices, including the second vertex type.

15. The computing device of claim 10, wherein the method carried out by the processor further comprises:
receiving a request to edit a column heading corresponding to a property of the selected subset of the properties of the first vertex type or to a property of the selected subset of the properties of the second vertex type,
wherein displaying the preview of the report comprises displaying the column heading corresponding to the property in accordance with the request.

16. The computing device of claim 10, wherein
the first group includes columns representing the selected subset of the properties of the first vertex type, and
the second group includes columns representing the selected subset of the properties of the second vertex type.

17. The computing device of claim 10, wherein the method carried out by the processor further comprises:
receiving, via the user interface, an input indicating a filter to be applied; and
configuring the report according to the filter.

18. The computing device of claim 10, wherein the method carried out by the processor further comprises:
receiving, via the user interface, an input indicating a sort to be applied; and
configuring the report according to the sort.

* * * * *